(12) United States Patent
Hane

(10) Patent No.: US 12,403,594 B2
(45) Date of Patent: Sep. 2, 2025

(54) ROBOT CONTROL DEVICE, AND ROBOT SYSTEM

(71) Applicant: Fanuc Corporation, Yamanashi (JP)

(72) Inventor: Mikito Hane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 203 days.

(21) Appl. No.: 18/033,211

(22) PCT Filed: Oct. 27, 2021

(86) PCT No.: PCT/JP2021/039711
§ 371 (c)(1),
(2) Date: Apr. 21, 2023

(87) PCT Pub. No.: WO2022/092168
PCT Pub. Date: May 5, 2022

(65) Prior Publication Data
US 2023/0321823 A1  Oct. 12, 2023

(30) Foreign Application Priority Data
Nov. 2, 2020  (JP) .................................. 2020-183920

(51) Int. Cl.
*B25J 9/16* (2006.01)
*B25J 13/08* (2006.01)
*G06T 7/73* (2017.01)

(52) U.S. Cl.
CPC ............ *B25J 9/1633* (2013.01); *B25J 9/1697* (2013.01); *B25J 13/085* (2013.01); *G06T 7/74* (2017.01);
(Continued)

(58) Field of Classification Search
CPC ...... B25J 9/1633; B25J 9/1697; B25J 13/085; B25J 9/1658; B25J 9/1687; G06T 7/74;
(Continued)

(56) References Cited

U.S. PATENT DOCUMENTS 7,181,315 B2   2/2007 Watanabe et al.
2005/0225278 A1* 10/2005 Ban .................. B25J 9/1692
                                    318/568.11
(Continued)

FOREIGN PATENT DOCUMENTS

JP        03251378 A    11/1991
JP      2004009209 A     1/2004
(Continued)

OTHER PUBLICATIONS

International Search Report and Written Opinion for International Application No. PCT/JP2021/039711 dated Jan. 18, 2022, 7 pages.

*Primary Examiner* — Adam R Mott
*Assistant Examiner* — Sagar Kc
(74) *Attorney, Agent, or Firm* — Buchanan Ingersoll & Rooney PC

(57) ABSTRACT

Provided is a robot control device capable of facilitating the work of setting a control center for controlling the operation of a robot. The robot control device controls a robot manipulator which is equipped with an end effector. The robot control device includes: an image processing unit that, by using a feature extraction model for detecting images of the robot manipulator, and position/posture information of the robot manipulator, detects, from images (M1, M2) in which at least part of the robot manipulator is captured, a position in a three-dimensional space which corresponds to designated positions (P1, P2) designated on the images, as a position relative to the robot manipulator; and a coordinate system determination unit that sets a control center, for controlling the operation of the robot manipulator, to the position detected in the three-dimensional space.

12 Claims, 8 Drawing Sheets

(52) U.S. Cl.
CPC ............... *G06T 2207/20092* (2013.01); *G06T 2207/30164* (2013.01)

(58) Field of Classification Search
CPC  G06T 2207/20092; G06T 2207/30164; G05B 2219/40032; G05B 2219/40099
See application file for complete search history.

(56) References Cited

U.S. PATENT DOCUMENTS

| | | | | |
|---|---|---|---|---|
| 2009/0118864 | A1* | 5/2009 | Eldridge | B25J 9/1692 901/29 |
| 2013/0238131 | A1* | 9/2013 | Kondo | B25J 9/1697 700/259 |
| 2017/0277167 | A1* | 9/2017 | Noda | B25J 9/1643 |
| 2018/0117764 | A1* | 5/2018 | Takeuchi | B25J 13/085 |
| 2018/0154518 | A1* | 6/2018 | Rossano | B25J 9/1671 |
| 2019/0358824 | A1* | 11/2019 | Takeuchi | B25J 9/161 |
| 2020/0101599 | A1 | 4/2020 | Yoshida | |

FOREIGN PATENT DOCUMENTS

| | | | |
|---|---|---|---|
| JP | 2004-243516 A | | 9/2004 |
| JP | 2005111618 A | | 4/2005 |
| JP | 2015062991 A | | 4/2015 |
| JP | 2020055075 A | | 4/2020 |
| JP | 2020075325 A | * | 5/2020 |

\* cited by examiner

ROBOT CONTROL DEVICE, AND ROBOT SYSTEM

CROSS REFERENCE TO RELATED APPLICATIONS

This is the U.S. National Phase application of PCT/JP2021/039711, filed Oct. 27, 2021, which claims priority to Japanese Patent Application No. 2020-183920, filed Nov. 2, 2020, the disclosures of these applications being incorporated herein by reference in their entireties for all purposes.

FIELD OF THE INVENTION

The present invention relates to a robot controller and a robot system.

BACKGROUND OF THE INVENTION

When a robot system causing a robot manipulator equipped with a tool as an end effector at an arm tip to execute a predetermined task is constructed, a coordinate system for controlling operation of the robot manipulator, such as a tool coordinate system, is preferably set (for example, see PTL 1).

When setting a tool coordinate system, a user may perform an operation of causing the robot manipulator to take postures from several directions in such a way that a control center of the tool (generally a tool tip point) matches a reference position. Such an operation may be referred to as a touch-up. For example, PTL 2 describes setting of a coordinate system by a touch-up.

PATENT LITERATURE

[PTL 1] Japanese Unexamined Patent Publication (Kokai) No. 2015-0
[PTL 2] Japanese Unexamined Patent Publication (Kokai) No. H3-251378 A

SUMMARY OF THE INVENTION

A touch-up as described above is a sophisticated and time-consuming task and is a task inviting errors particularly for an inexperienced novice. A robot controller and a robot system that simplify a setting task of a control center for controlling operation of a robot is preferred.

An aspect of the present disclosure is a robot controller configured to control a robot manipulator equipped with an end effector, the robot controller including: an image processing unit configured to detect, as a relative position with respect to the robot manipulator, a position in a three-dimensional space from an image in which at least part of the robot manipulator is captured, the position being related to a designated position designated on the image, by using a feature extraction model for performing image detection of the robot manipulator and position-posture information of the robot manipulator; and a coordinate system determination unit configured to set a control center for controlling operation of the robot manipulator to the position detected in the three-dimensional space.

Another aspect of the present disclosure is a robot system including: a robot manipulator equipped with an end effector; a robot controller configured to control the robot manipulator; a teaching operation device being connected to the robot controller and including an image capture device; a storage unit in which a feature extraction model for performing image detection of the robot manipulator is stored; an image processing unit configured to detect, as a relative position with respect to the robot manipulator, a position in a three-dimensional space from an image in which at least part of the robot manipulator is captured, the image being captured by the image capture device and the position being related to a designated position designated on the image, by using the feature extraction model and position-posture information of the robot manipulator; and a coordinate system determination unit configured to set a control center for controlling operation of the robot manipulator to the position detected in the three-dimensional space.

The aforementioned configuration can simplify setting of a control center for controlling operation of a robot.

The object, the feature, the advantage, and other objects, features, and advantages of the present invention will become more apparent from detailed description of typical embodiments of the present invention illustrated in the attached drawings.

BRIEF DESCRIPTION OF DRAWINGS

FIG. 7 is a diagram illustrating an example of a captured image used in pattern matching or the like.

DETAILED DESCRIPTION OF EMBODIMENTS OF THE INVENTION

Next, an embodiment of the present disclosure will be described with reference to drawings. In the referenced drawings, similar components or functional parts are given similar reference signs. In order to facilitate understanding, the drawings use different scales as appropriate. Further, a configuration illustrated in a drawing is an example of implementation of the present invention, and the present invention is not limited to the illustrated configuration.

Figure 1:
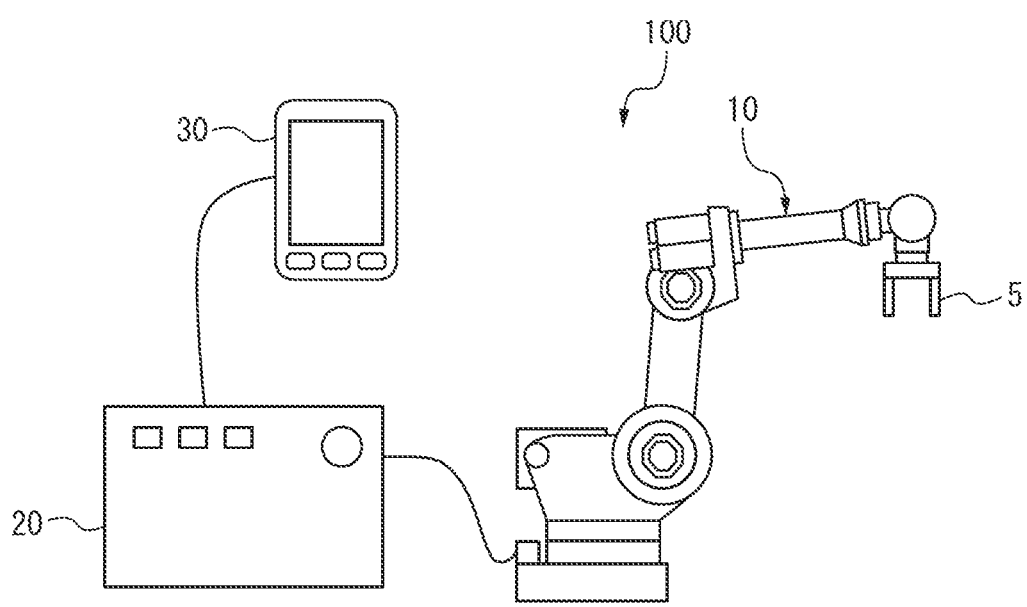
FIG. 1 is a diagram illustrating a device configuration of a robot system according to an embodiment.

FIG. 1 is a diagram illustrating a device configuration of a robot system 100 according to an embodiment. As illustrated in FIG. 1, the robot system 100 includes a robot manipulator 10 equipped with a hand 5 as an end effector (hereinafter described as a robot 10), a robot controller 20 controlling the robot 10, and a teaching operation device 30 connected to the robot controller 20. The connection between the teaching operation device 30 and the robot controller 20 may be performed by a wired connection or a wireless connection.

While the robot 10 according to the present embodiment is assumed to be a six-axis vertical articulated robot, another type of robot may be used. The hand 5 is mounted on a flange face of an arm tip of the robot 10.

The robot controller 20 controls operation of the robot 10 in accordance with an operation input from the teaching operation device 30 or in accordance with an operation program stored in the robot controller 20. Note that the robot controller 20 may be configured as a common computer including a CPU, a ROM, a RAM, a storage device, an operation unit, a display unit, an input-output interface, and a network interface.

The teaching operation device 30 has a function of performing a teaching operation on the robot 10 and various settings related to teaching, and the like. While a tablet terminal is used as the teaching operation device 30 in FIG. 1, various portable terminals such as a teach pendant and a smartphone may be used as the teaching operation device 30. Note that the teaching operation device 30 may be configured as a common computer including a CPU, a ROM, a RAM, a storage device, an operation unit, a display unit, an input-output interface, and a network interface.

Figure 2:
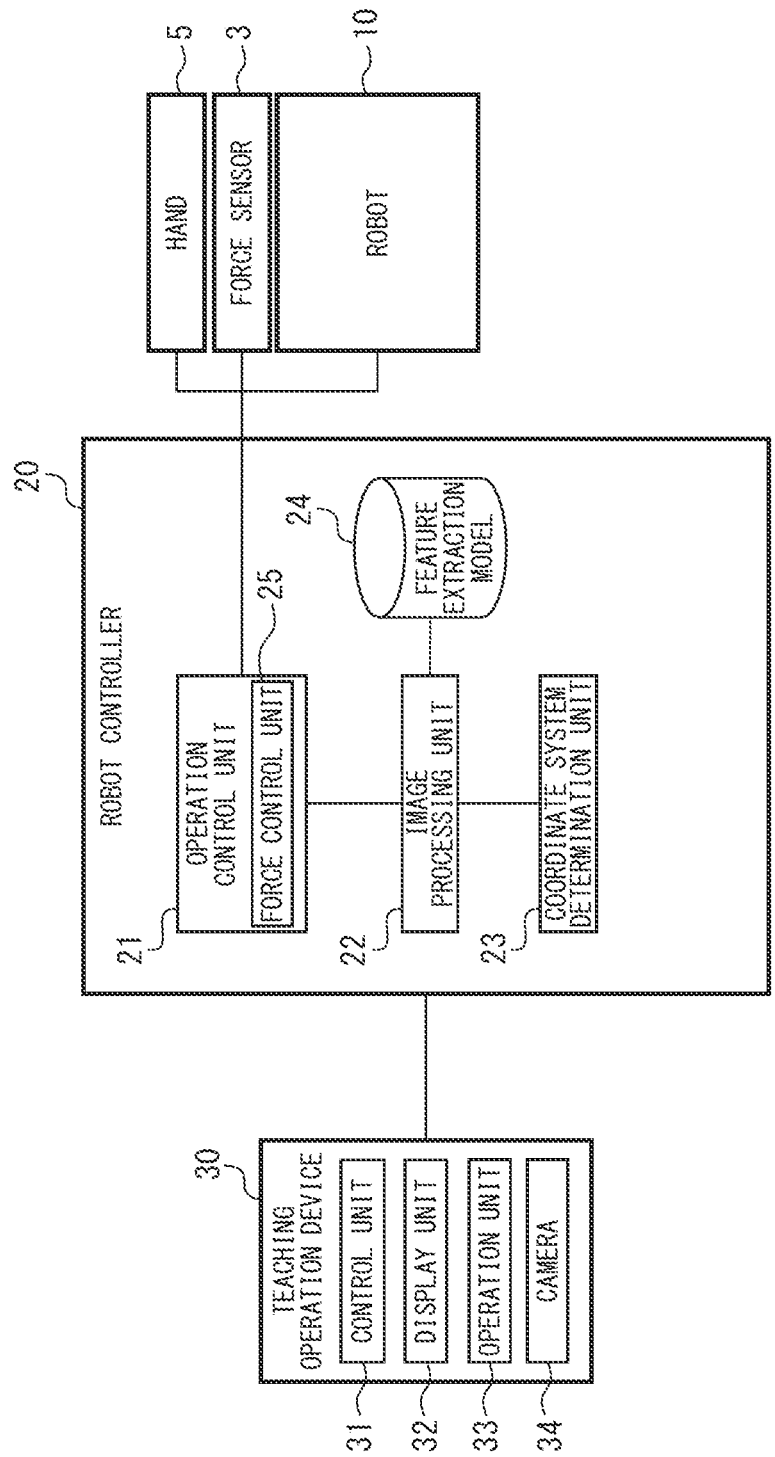
FIG. 2 is a block diagram illustrating functional configurations of a robot controller and a teaching operation device.

The teaching operation device 30 according to the present embodiment further includes a camera 34 as an image capture device (see FIG. 2). As will be described in detail below, the robot controller 20 according to the present embodiment provides a function of setting a control center being a control target of the operation of the robot 10 and coordinate systems (such as a tool coordinate system and a force control coordinate system) by using an image captured by the camera 34 in the teaching operation device 30 in such a way as to include part of the robot 10 (such as a tool tip).

FIG. 2 is a block diagram illustrating functional configurations of the robot controller 20 and the teaching operation device 30. As illustrated in FIG. 2, the robot controller 20 includes an operation control unit 21, an image processing unit 22, and a coordinate system determination unit 23. Further, the robot controller 20 stores a feature extraction model 24 in a storage unit. The operation control unit 21 executes operation control of the robot 10. More specifically, the operation control unit 21 executes position control of a control center (such as a tool tip point) of the robot 10 by interpreting an operation instruction, calculating a position command for each axis motor in the robot 10, and executing servo control of the axis motor in accordance with the position command. The operation control unit 21 may further have a function of controlling an open-close operation of the hand 5. The image processing unit 22 detects, as a relative position with respect to the robot 10, a position in a three-dimensional space from an image in which at least part of the robot 10 is captured, the position being related to a designated position designated on the image, by using the feature extraction model 24 for performing image detection of the robot 10 and position-posture information of the robot 10. The coordinate system determination unit 23 sets a control center for controlling the operation of the robot 10 to the position detected in the three-dimensional space.

Figure 10:
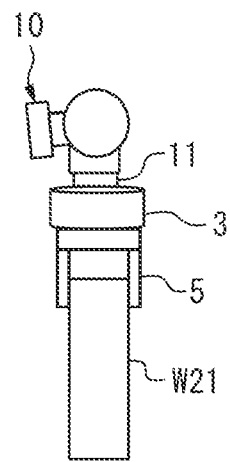
FIG. 10 is a diagram illustrating a state of placing a force sensor between a flange and a hand.

The robot 10 may be further equipped with a force sensor 3 in order to execute force control. FIG. 2 illustrates a configuration example of the robot 10 being equipped with the force sensor 3 detecting an external force applied to the arm tip. For example, the force sensor 3 is placed between the hand 5 and a flange 11, as illustrated in FIG. 10. When the robot 10 is equipped with the force sensor 3, the operation control unit 21 further includes a force control unit 25 executing force control using the force sensor 3.

The teaching operation device 30 includes a control unit 31 handling control of a teaching input operation and various setting functions, a display unit 32 displaying an operation screen related to the teaching input operation and the various setting functions, and an operation unit 33 for performing various input operations. For example, the display unit 32 includes a liquid crystal display as a display device. As an example, the operation unit 33 may be configured with a software key using a touch panel. The teaching operation device 30 further includes the camera 34 as an image capture device. For example, the camera may be a two-dimensional camera capturing a two-dimensional image or a three-dimensional camera acquiring a three-dimensional position of a target by, for example, a stereo method. An image captured by the camera 34 is displayed on the display unit 32. As will be described later, a user can perform setting of a control center for controlling the operation of the robot 10 and a coordinate system by designating the position of the control center on an image acquired by capturing an image of the robot 10 by using the camera 34 in the teaching operation device 30. The teaching operation device 30 operates in such a way as to display a captured image on the display unit 32 under control of the image processing unit 22 in the robot controller 20 and then accept the designation operation as described above through the operation unit 33.

Figure 3:
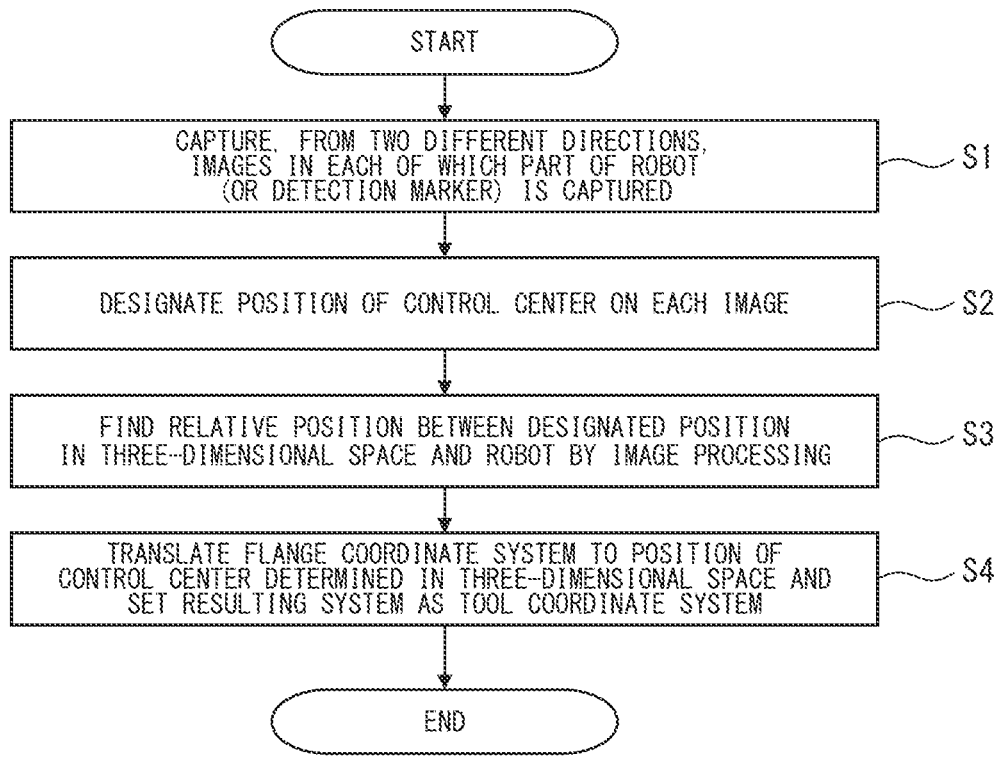
FIG. 3 is a flowchart illustrating a flow of control center-coordinate system setting processing.

Next, a function of setting a control center and a coordinate system by designating, by a user, the control center on an image captured by the camera 34 in the teaching operation device 30 (hereinafter described as control center-coordinate system setting processing) will be described. FIG. 3 is a flowchart illustrating a flow of the control center-coordinate system setting processing. Note that the control center-coordinate system setting processing is mainly executed under control of a CPU in the robot controller 20; and the teaching operation device 30 is used as an operation terminal for performing various types of operation input by the user.

Figure 4:
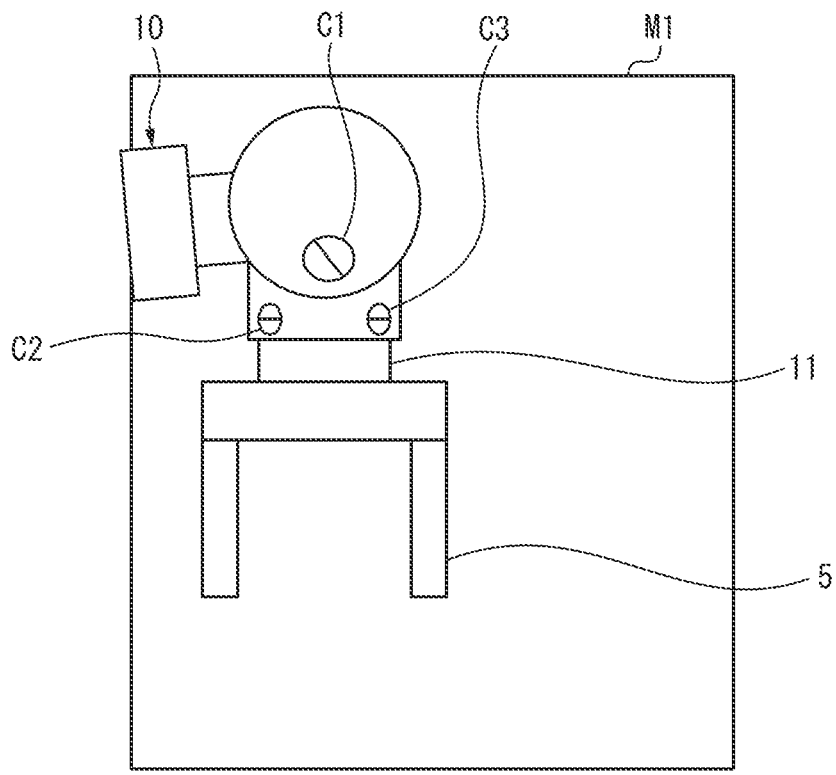
FIG. 4 is a diagram illustrating an example of a captured image including detection markers.

First, the user captures, from different directions, two images in each of which part of the robot 10 (or a detection marker) is captured (step S1). The two captured images are referred to as a camera image M1 and a camera image M2. For example, the camera image M1 is an image as illustrated in FIG. 4. A robot arm tip affixed with three detection markers C1 to C3, the flange 11, and the hand 5 are captured in the example of the camera image M1 in FIG. 4. Note that the camera image M2 is an image in which the image capture targets of the camera image M1 are captured from another angle.

Figure 5:
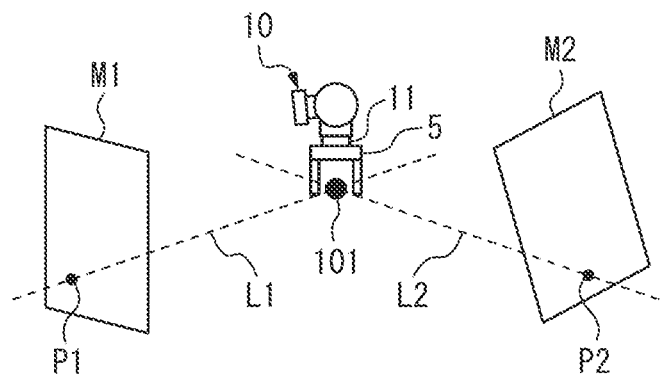
FIG. 5 is a diagram for illustrating an example of image capture directions of two captured images with respect to an arm tip.

For example, image capture directions of the camera image M1 and the camera image M2 with respect to the arm tip as an image capture target are ones as illustrated in FIG. 5. The user designates a preferred position of a control center for performing operation control of the robot 10 in each of the camera image M1 and the camera image M2 (step S2). Examples of the operation of designating a position on an image by the user may include an operation of tapping a touch panel and designation by operating another pointing device. It is assumed that the user designates the central position of a plurality of grip jaws of the hand 5 as a preferred position of the control center, as illustrated in FIG. 5. In this case, the user designates the central position of the grip jaws of the hand 5 in each of the camera images M1 and M2. The image processing unit 22 accepts such a designation operation through the teaching operation device 30. Positions each being designated by the user as the center of the tip of the plurality of grip jaws of the hand 5 on the camera images M1 and M2 are indicated as a designated position P1 and a designated position P2, respectively.

Next, the image processing unit 22 detects a relative position between the designated position in a three-dimensional space and the robot 10 by image processing by using a feature extraction model 24 (detection markers or a 3D model of the robot 10) for extracting a feature of the robot 10 on an image (step S3). An example of the detection markers C1 to C3 existing at the arm tip of the robot 10 as illustrated in FIG. 4 will be described. In this case, information about features and placements of images of the detection markers C1 to C3 are used as the feature extraction model 24. How the three detection markers C1 to C3 are viewed and a viewable detection marker vary depending on the angle from which the robot 10 is observed. The image processing unit 22 detects the three detection markers C1 to C3 by image-processing each of the camera images M1 and M2 and determines the direction viewed from the flange 11 from which each of the camera images M1 and M2 is captured, by analyzing how the three detection markers C1 to C3 are viewed. Furthermore, since the plurality of detection markers C1 to C3 exist on each image, and spaces between the plurality of detection markers C1 to C3 are known from the feature extraction model 24, the image processing unit 22 can recognize the scale of the image (i.e., the correspondence between the size on the image and the actual size).

By the aforementioned image processing, the image processing unit 22 recognizes that an image capture direction with respect to the flange 11 is the direction illustrated in FIG. 5 for each of the camera images M1 and M2. Note that the image processing unit 22 also uses current position-posture information of the robot 10 at this time. What one camera image tells is that a designated position on the image exists on an axis in a three-dimensional space. In FIG. 5, an axis on which a position being related to the designated position P1 in the three-dimensional space may exist, the axis being determined by image processing on the camera image M1, is indicated as an axis L1, and an axis on which a position related to the designated position P2 in the three-dimensional space may exist, the axis being determined by image processing on the camera image M2, is indicated as an axis L2. In other words, the designated position P1 exists on the axis L1 in the three-dimensional space, and the designated position P2 exists on the axis L2 in the three-dimensional space. In this case, the intersection 101 of the axis L1 and the axis L2 is a position of the control center designated by the user in the three-dimensional space. The image processing unit 22 determines the position of the intersection 101. From the above, a position related to the designated position on the image in the three-dimensional space (a relative position with respect to the robot 10) is found (step S3).

Figure 6:
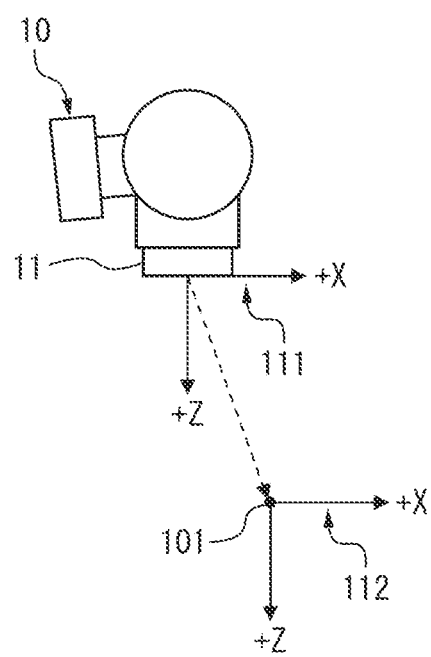
FIG. 6 is a diagram for illustrating a state of setting a tool coordinate system by translating a flange coordinate system.

A flange coordinate system 111 including the origin at the central position of the flange face is preset for the robot 10, as illustrated in FIG. 6. In step S4, the coordinate system determination unit 23 sets a tool coordinate system 112 by translating the origin of the known flange coordinate system 111 to the control center (intersection 101) determined in step S3.

Figure 7:
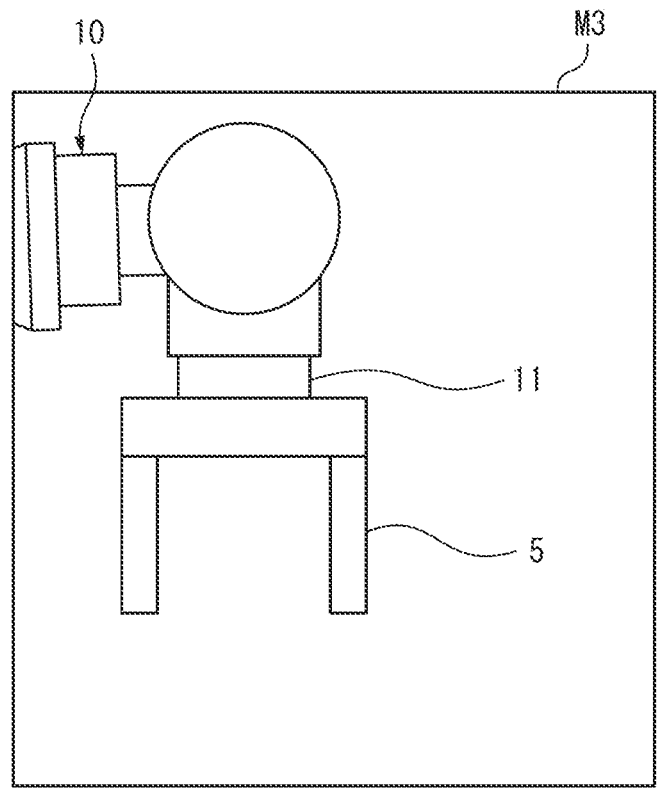

Next, a method for finding a relative position between a designated position in an image and the robot 10 by pattern matching by using a 3D model of the robot 10 as the feature extraction model 24 will be described. This method also causes a user to capture, from different directions, two images each including part of the robot 10, similarly to the case of using detection markers (step S1). It is assumed that one of the captured images is a camera image M3 including two links on the arm tip side and the hand 5, as illustrated in FIG. 7. In this case, the other image is an image in which the image capture targets in FIG. 7 are captured from another angle.

The user designates a preferred position of a control center on each image (step S2). Next, the image processing unit 22 finds a relative position between the designated position and the robot 10 in each image (step S3). The process will be specifically described. When a captured image is one as illustrated in FIG. 7, the image processing unit 22 performs image detection by using a model of the arm tip (hereinafter described as a robot model) in the 3D model of the robot 10. For example, the image processing unit 22 may determine the posture of the arm tip captured in the image by applying a face authentication technology by using information about the shapes and the placements of a flat part, a projecting part, and a recessed part of the arm tip and determine the image capture direction of the image, based on the current position-posture information of the robot 10. Alternatively, the image processing unit 22 may extract a contour from the image by an edge detection method, execute pattern matching between the contour and a contour of the robot model (a contour of the arm tip), determine the posture of the arm tip captured in the image, and determine the image capture direction of the image, based on the current position-posture information of the robot 10.

Then, the position of the designated position in the three-dimensional space is determined as the intersection of axes in image capture directions found from the two images (i.e., a relative position between the designated position and the robot 10 is found) (step S3). Next, the coordinate system determination unit 23 sets a tool coordinate system by translating the flange coordinate system to the determined control center (intersection) (step S4).

The control center-coordinate system setting processing described above enables the user to complete setting of a control center and a coordinate system merely by performing an operation of capturing images of the robot 10 with the camera 34 in the teaching operation device 30 and performing an operation of designating a preferred position of a control center on the image. In other words, the setting operation of a control center and a coordinate system can be simplified. No complicated task such as calibration is required of the camera 34.

Note that three or more images may be captured, and a control center can be found from the intersection of axes of image capture directions acquired from the three or more images by a technique similar to the above.

While an example of determining a control center from two or more images has been described above, a control center can be determined from one image. An example of determining the position of a control center in a three-dimensional space (a relative position with respect to the robot 10) from one image captured by a user will be described. The following procedures are performed.

(A1) The user captures an image under the restriction that an image of the arm tip of the robot 10 is captured sideways (along the Y-axis direction in the flange coordinate system).

(A2) The user designates a preferred position of a control center on an image captured under such a restriction. Note that an image parallel to the X-Z plane in the flange coordinate system 111 is captured in this case, as illustrated in FIG. 6.

(A3) The image processing unit 22 recognizes the scale of the image from the space between detection markers captured in the image and recognizes a designated position on the image as an X-Z coordinate position on the basis of a flange center (the origin of the flange coordinate system) in the image.

(A4) Thus, the position in the three-dimensional space related to the designated position on the image is determined as an X-Z coordinate position in the flange coordinate system.

Alternatively, the following technique may be used as a technique for determining a control center from one image. In this case, it is assumed to set a coordinate system being a control target on a central axis (i.e., on the Z-axis) of the flange coordinate system. The user captures an image including the flange 11. With regard to the direction in which the image is captured, it is preferable to capture the image sideways in terms of operation as described in the aforementioned procedure (A1); however, the image capture direction may not be particularly restricted. The image processing unit 22 accepts an operation of shifting the flange coordinate system in the Z-axis direction (such as a touch & slide operation) on the image including part of the flange 11 of the robot 10. In this case, the image processing unit 22 may display, on the image, an image representing the flange coordinate system by superimposition. The image processing unit 22 determines a shift amount of the flange coordinate system on the Z-axis caused by the user operation.

The coordinate system determination unit 23 translates the flange coordinate system to the position of the thus determined control center and sets a tool coordinate system.

Thus, even when one image is used, a user can complete setting of a control center and a coordinate system by merely performing an operation of designating a preferred position of a control center on an image. No complicated task such as calibration is required of the camera 34.

An example of designating a preferred position of a control center on a captured image by a user has been described above. Designation of a control center position on a captured image may be automatically performed on the robot controller 20 (image processing unit 22) side. For example, techniques as follows may be employed: (1) set a predetermined position (such as the central position) on a captured image to a designated position and (2) equip a sensor (such as an acceleration sensor or a gyro-sensor) detecting the position of the camera 34 in a three-dimensional space on the teaching operation device 30 and set starting points when the axes L1 and L2 in FIG. 5 are set (designated positions P1 and P2) to positions detected by the sensor (in this case, the teaching operation device 30 provides the robot controller 20 with a captured image and position information of the camera 34 when the image is captured).

Figure 8:
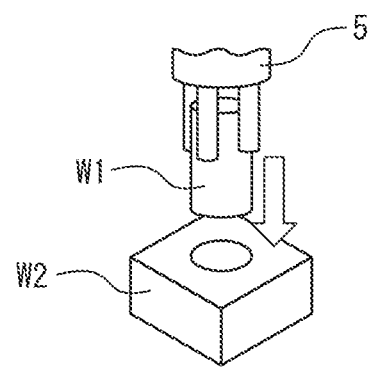
FIG. 8 is a diagram illustrating a state of performing a columnar fit with a robot manipulator.

Next, a columnar fit will be described as a specific example of performing a task of setting a control center as described above. The columnar fit is a task of inserting a columnar workpiece W1 held by the hand 5 into a hole formed on a workpiece W2, as illustrated in FIG. 8. It is assumed that there is a sufficient clearance between the outer surface of the workpiece W1 and the inner surface of the hole when the workpiece W1 is inserted into the hole and that there is no need for insertion by force control. In this case, a user sets a control center at the center of the tip surface of the workpiece W1 and sets a tool coordinate system with the control center as the origin. The robot controller 20 controls the robot 10 in such a way as to move the workpiece W1 until the origin (control center) of the tool coordinate system moves along the central axis of the hole and reaches the bottom of the hole.

Figure 9:
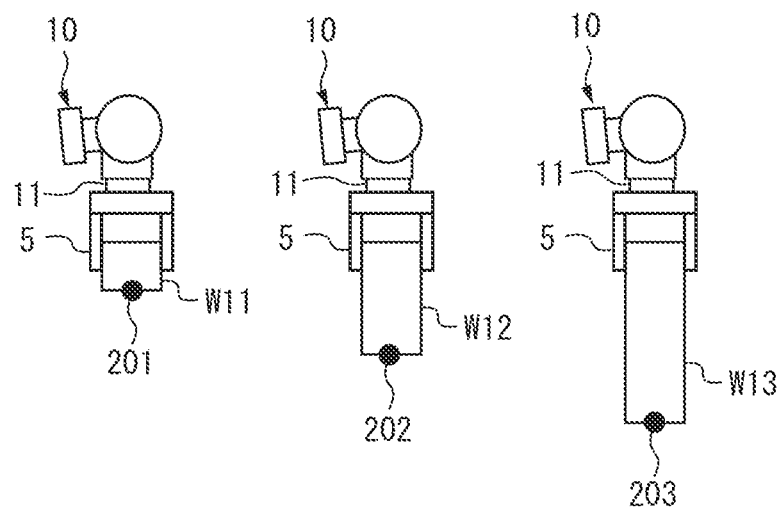
FIG. 9 is a diagram illustrating a state of setting control centers of fitted workpieces with different lengths, respectively.

When there is a variety in the length of the columnar workpiece held by the hand 5, the user sets a control center (tool coordinate system) to a workpiece with each length. FIG. 9 illustrates a situation in which control centers 201, 202, and 203 are set to three types of workpieces W11, W12, and W13 with different lengths, respectively. A tool coordinate system (see a force control coordinate system 113 in FIG. 12 as a reference) with the vertical downward direction as the Z-axis direction is set to each of the control centers 201 to 203.

Next, with regard to a task performed while executing force control, an example of setting a parameter related to force control by designation on an image will be described. When a clearance between the outer surface of a fitted workpiece and the inner surface of a hole is narrow in a state of the fitted workpiece being inserted into the hole (for example, when the clearance is ten-odd microns), the fitted workpiece is inserted in a state of being continuously in contact with the inner surface of the hole. In this case, an insertion task of inserting the fitted workpiece is performed while modifying the posture of the robot 10 while observing a force applied to the fitted workpiece. In this case, the force sensor 3 is placed between the hand 5 and the flange 11, as illustrated in FIG. 10. For example, the force sensor 3 is a six-axis force sensor outputting a load on three axes (XYZ) and a moment around each axis as detected values. The force sensor 3 detects a force applied to the fitted workpiece W21 and a moment in the fitting task. By observing the output of the force sensor 3, the robot controller 20 (the operation control unit 21 and the force control unit 25) controls the position and the posture of the robot 10 in such a way that a moment with respect to a control center set at the center of the tip surface of the fitted workpiece W21 becomes zero. When force control is performed, the force control unit 25 uses the control center being set as described above as a control point (a reference point for calculation of a moment, and the like) in force control. The coordinate system determination unit 23 translates the flange coordinate system to the control point and sets the resulting system as a force control coordinate system (see the force control coordinate system 113 in FIG. 12).

The image processing unit 22 may be configured to accept, through an image, setting of a pressing direction as a parameter related to force control. Two examples of setting a pressing direction as a force control parameter through an image will be described with reference to FIG. 11 and FIG. 12.

Figure 11:
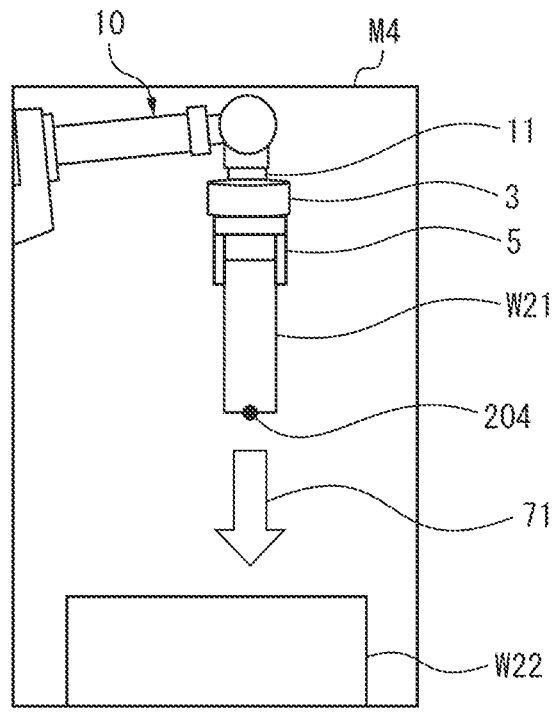
FIG. 11 is a diagram illustrating a first example of a setting operation of a pressing direction in force control.

As illustrated in FIG. 11, the arm tip side of the robot 10, the force sensor 3, the hand 5, the fitted workpiece W21, a workpiece W22, and a control center 204 set by a user are displayed in an image M4. For example, in such an image M4, in order to assist setting of a pressing direction of force control by the user, the image processing unit 22 displays an arrow 71 along the Z-axis direction (vertical downward direction) as an image. When the arrow 71 matches a desired pressing direction, for example, the user may tap and select the image of the arrow 71. The image processing unit 22 accepts such a selection operation by the user. The image processing unit 22 may display images of three arrows in the X, Y, and Z directions on the image M4 and cause the user to select a desired pressing direction.

Figure 12:
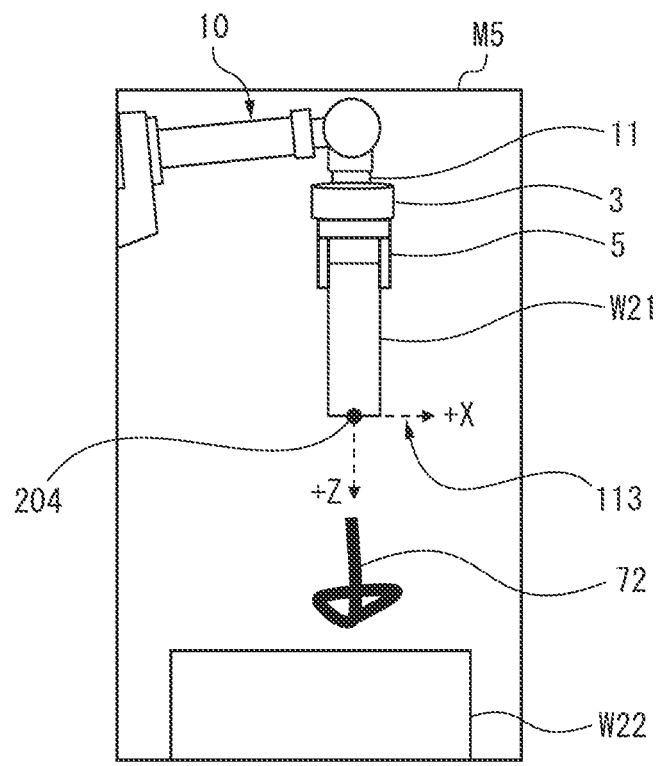
FIG. 12 is a diagram illustrating a second example of the setting operation of a pressing direction in the force control.

As illustrated in FIG. 12, the arm tip side of the robot 10, the force sensor 3, the hand 5, the fitted workpiece W21, the workpiece W22, and the control center 204 set by a user are displayed in an image M5. On such an image M5, the image processing unit 22 accepts a user operation of designating a pressing direction by a flick operation or drawing a pressing direction on the image freehand as an arrow (an arrow 72 in FIG. 12). Then, the image processing unit 22 selects, as a pressing direction, a direction of an axis closest to the direction of the flick operation or the direction of the arrow 72 drawn as an image out of the axes of the force control coordinate system 113 set at the tip of the fitted workpiece W21. In the example in FIG. 12, the Z-axis direction is selected as a pressing direction.

The force control unit 25 executes force control in the pressing direction determined as described above.

Figure 13:
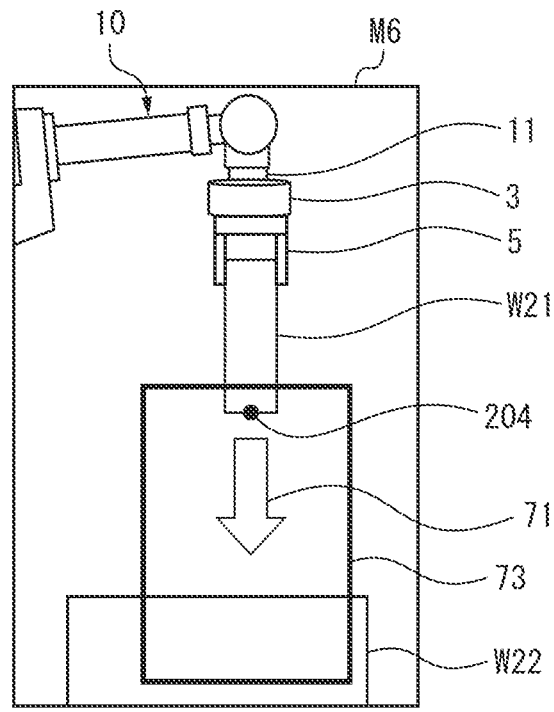
FIG. 13 is a diagram illustrating an operation of designating an area allowing operation by the force control.

Next, as another example of force control parameter designation, a setting example of a range in a depth direction (the Z-axis direction in this case) allowing execution of force control will be described with reference to FIG. 13. FIG. 13 is a diagram illustrating an example of the image processing unit 22 performing, on an image, setting of a range in a depth direction (a range in a traveling direction of the tool) allowing execution of force control as a parameter related to force control. The arm tip side of the robot 10, the force sensor 3, the hand 5, the fitted workpiece W21, the workpiece W22, and the control center 204 set by a user are displayed in an image M6 illustrated in FIG. 13. On such an image M6, the image processing unit 22 accepts a user operation of setting a range in a depth direction (Z-axis direction) allowing operation by force control by, for example, drawing an image of a rectangular frame (a rectangular frame 73 in FIG. 13) freehand. The force control unit 25 in the robot controller 20 applies force control when the control center (control point) 204 is within a range of the rectangular frame 73 in the Z-axis direction. Note that designation of the rectangular frame may also be expressed as designation of an area allowing execution of force control.

Figure 14:
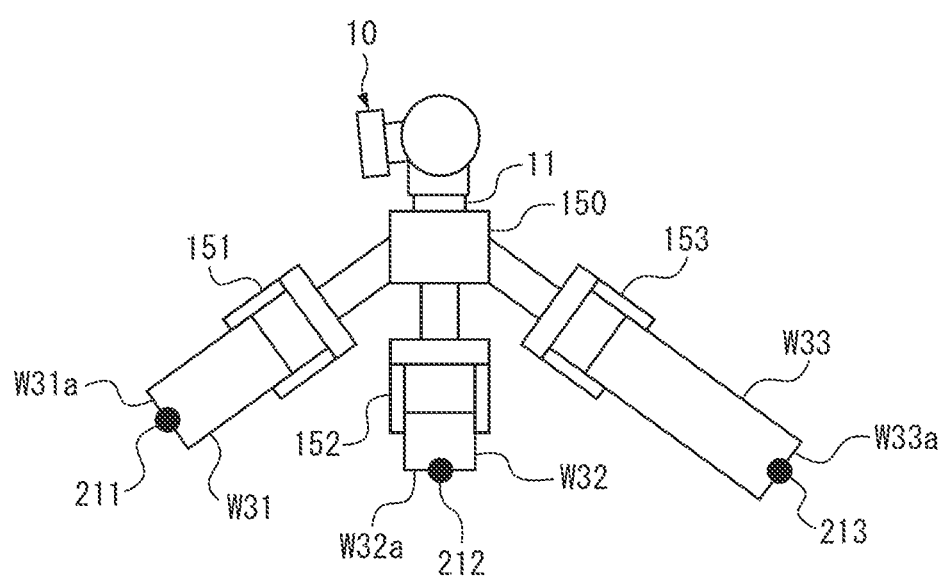
FIG. 14 is a diagram for illustrating setting of a tool coordinate system for a hand into which a plurality of chuck hands are integrated.

Next, an example of setting a tool coordinate system for a hand into which a plurality of chuck hands are integrated as illustrated in FIG. 14 will be described. A hand 150 illustrated in FIG. 14 includes a plurality of chuck hands 151 to 153. The chuck hands 151, 152, and 153 hold workpieces W31, W32, and W33, respectively. It is assumed that control centers 211, 212, and 213 are set for the workpieces W31 to W33, respectively, by the aforementioned technique. A tool coordinate system is set by the following procedures. A 3D camera that can detect a three-dimensional position of a target is used as the camera 34.

(B1) The image processing unit 22 detects a plane as a workpiece tip surface for each of the workpieces W31, W32, and W33 from an image including the hand 150. For example, a plane detection method by the three-dimensional Hough transform may be used as a technique for detecting a plane by image processing. Thus, respective tip surfaces W31a, W32a, and W33a of the workpieces W31, W32, and W33 are detected.

(B2) Next, the coordinate system determination unit 23 finds a rotation matrix of each of the tip surfaces W31a, W32a, and W33a in the normal direction with respect to the Z-direction of the flange coordinate system. Then, the coordinate system determination unit 23 sets a tool coordinate system for each of the control centers 211, 212, and 213 by performing an operation of translating the origin of the flange coordinate system to each of the control centers 211, 212, and 213 and multiplying by a rotation matrix found for each tip surface.

Note that in a situation in which the image capture direction and the scale are known from an image in which the hand 150 is captured, the coordinate system determination unit 23 may set the origin of the tool coordinate system to a point (such as the center) on a workpiece tip surface detected in aforementioned (B1) and automatically set the tool coordinate system in such a way that the normal direction of the workpiece tip surface matches the Z-axis direction of the tool coordinate system.

As described above, the present embodiment enables simplification of setting of a control center for controlling the operation of the robot.

While the present invention has been described above by using the typical embodiment, it may be understood by a person skilled in the art that changes, and various other changes, omissions, and additions can be made to the aforementioned embodiment without departing from the scope of the present invention.

The distribution of the functions in the robot system according to the aforementioned embodiment illustrated in the block diagram in FIG. 2 is an example, and various modifications may be made. For example, a configuration example of placing the function of the image processing unit 22 on the teaching operation device 30 side may be employed.

Each functional block in the functional block diagram of the robot controller 20 illustrated in FIG. 2 may be provided by executing various types of software stored in the storage device by the CPU in the robot controller 20 or may be provided by a configuration mainly based on hardware such as an application specific integrated circuit (ASIC).

A program executing the control center-coordinate system setting processing according to the aforementioned embodiment can be recorded on various computer-readable recording media (such as semiconductor memories such as a ROM, an EEPROM, and a flash memory, a magnetic recording medium, and optical disks such as a CD-ROM and a DVD-ROM).

REFERENCE SIGNS LIST

3 Force sensor
5, 150 Hand
10 Robot manipulator
11 Flange
20 Robot controller
21 Operation control unit
22 Image processing unit
23 Coordinate system determination unit
24 Feature extraction model
25 Force control unit
30 Teaching operation device
31 Control unit
32 Display unit
33 Operation unit
34 Camera
100 Robot system
C1, C2, C3 Detection marker

The invention claimed is:

1. A robot controller configured to control a robot manipulator equipped with an end effector, the robot controller comprising a processor configured to:
    detect, as a relative position with respect to the robot manipulator, a position in a three-dimensional space from an image in which at least part of the robot manipulator is captured, the position being related to a designated position designated on the image, by using a feature extraction model for performing image detection of the robot manipulator and position and posture information of the robot manipulator;

set a control center for controlling operation of the robot manipulator to the position detected in the three-dimensional space by translating an origin of a flange coordinate system preset at a center of a flange of the robot manipulator to the position detected in the three-dimensional space; and execute position control of the control center of the robot manipulator.

2. The robot controller according to claim 1, wherein, by using two or more images of at least part of the robot manipulator captured from different directions, each image being an image in which at least part of the robot manipulator is captured, the processor is further configured to detect a position in the three-dimensional space, the position being related to a designated position designated in each of the two or more images.

3. The robot controller according to claim 1, wherein the processor is further configured to accept designation of the designated position by a user operation on the image.

4. The robot controller according to claim 1, wherein the processor is further configured to automatically set the designated position to a predetermined position in the image.

5. The robot controller according to claim 1, wherein the processor is further configured to execute force control, wherein the processor sets the control center as a control point for performing the force control.

6. The robot controller according to claim 5, wherein the processor is further configured to accept an operation of designating, on the image, a pressing direction of the force control.

7. The robot controller according to claim 5, wherein the processor is further configured to accept an operation of designating, on the image, an area allowing execution of the force control.

8. The robot controller according to claim 1, wherein the processor is further configured to set a coordinate system with the control center as an origin.

9. The robot controller according to claim 8, wherein a workpiece held by a hand as the end effector is captured in the image, and the processor is further configured to:
detect a plane on a tip of the workpiece from the image, and
set the coordinate system with a point on the plane as an origin in such a way that a normal direction of the plane matches a predetermined axis of the coordinate system.

10. A robot system comprising:
a robot manipulator equipped with an end effector;
a robot controller comprising a processor configured to control the robot manipulator;
a teaching operation device being connected to the robot controller and including an image capture device; and
a storage in which a feature extraction model for performing image detection of the robot manipulator is stored, wherein the processor is further configured to:
detect, as a relative position with respect to the robot manipulator, a position in a three-dimensional space from an image in which at least part of the robot manipulator is captured, the image being captured by the image capture device and the position being related to a designated position designated on the image, by using the feature extraction model and position and posture information of the robot manipulator;
set a control center for controlling operation of the robot manipulator to the position detected in the three-dimensional space by translating an origin of a flange coordinate system preset at a center of a flange of the robot manipulator to the position detected in the three-dimensional space; and
execute position control of the control center of the robot manipulator.

11. The robot system according to claim 10, wherein:
the robot manipulator is equipped with a force sensor, and the processor is further configured to:
execute force control, based on a detected value of the force sensor, and
set the control center as a control point for performing the force control.

12. The robot system according to claim 10, wherein the processor is further configured to set a coordinate system with the control center as an origin.

* * * * *